United States Patent [19]

Larson

[11] 4,246,293

[45] Jan. 20, 1981

[54] PROCESS OF PREPARING POTATO SNACK PRODUCT

[76] Inventor: James M. Larson, Radcliffe, Iowa 50230

[21] Appl. No.: 944,322

[22] Filed: Sep. 21, 1978

[51] Int. Cl.$^3$ .............................................. A23L 1/216
[52] U.S. Cl. .................................... 426/637; 426/808
[58] Field of Search ................................ 426/637, 808

[56] References Cited

U.S. PATENT DOCUMENTS

| | | | |
|---|---|---|---|
| Re. 29773 | 9/1978 | Wisdom et al. | 426/637 |
| 2,787,553 | 4/1957 | Cording, Jr. | 426/473 |
| 3,021,224 | 2/1962 | Stagmeier | 426/637 |
| 3,220,857 | 11/1965 | Hollis, Jr. et al. | 426/473 |
| 3,396,036 | 8/1968 | Liepa | 426/637 |
| 3,493,390 | 2/1970 | Succo | 426/637 |
| 3,692,531 | 9/1972 | Heusdens et al. | 426/808 |
| 3,849,582 | 11/1974 | Blagdon et al. | 426/808 |

*Primary Examiner*—Raymond N. Jones
*Assistant Examiner*—Elizabeth A. Hatcher
*Attorney, Agent, or Firm*—Zarley, McKee, Thomte, Voorhees & Sease

[57] ABSTRACT

A protein fortified complete meal snack item is prepared from a whole potato base by a process involving subdivision of whole potatoes, including skins, to provide potato pieces, adding on a weight basis of from 10% to 40% by weight of said potato pieces of edible protein fortifying additives, intimately admixing the protein additives and the whole potato pieces to provide a substantially homogeneous mixture, and extruding which provides at least partial cooking of said homogeneous mixture, resulting in a protein fortified snack food extrudate. The resulting product contains substantially the complete starch food value, and vitamin value of the starting potato.

7 Claims, No Drawings

PROCESS OF PREPARING POTATO SNACK PRODUCT

BACKGROUND OF THE INVENTION

This invention relates to treated food products in its broadest sense, and more particularly to starch based snack food products. It, of course, goes without saying that potato based snack food items have heretofore been known. Examples include potato chips, and in more recent times, potato chip like products prepared from dehydrated potatoes which have added moisture forming a dough which is then fried to provide uniform and consistent chip like products.

However, one deficiency of such products is that they are largely only farinacious material and as such lack substantial nutrient value. This is true for most such products whether or not they are potato based, or cereal grain based, such as corn chips, or based upon other grains such as wheat, rye or the like.

Accordingly, one object of this invention is to provide a tasty protein fortified snack food item of substantially high nutritional value.

Yet another object of this invention is to provide a whole potato based complete meal snack item which uses the entire potato including the skin, starchy material and the vitamins normally cooked out of potatoes during the cooking process.

A still further object of this invention is to provide a snack food item which at the process operator's choosing can be fortified with textured vegetable protein, meats or meat by-products, dried fruit bits, milk solids, or the like.

An even further object of this invention is to provide a whole potato based snack food item which can be prepared conveniently and simply in a one step extrusion operation with the ultimate shape being controlled by the die employed at the end of the extruder barrel.

The method and means of accomplishing these and other objects will become apparent from the detailed description of the invention which follows.

SUMMARY OF THE INVENTION

Whole potatoes are subdivided to provide potato pieces, from about 10% to about 40% by weight of said potato pieces of an edible protein is added to said potato pieces, the resulting mixture is intimately admixed to provide a substantially homogeneous mixture and the mixture is thereafter extruded under controlled conditions of temperature and pressure to provide at least partial cooking of said homogeneous mixture and to provide a protein fortified snack food extrudate.

DETAILED DESCRIPTION OF THE INVENTION

In accordance with the process of this invention, whole potatoes are obtained and of course washed and cleaned in conventional manners and readied for subsequent processing treatment. The potatoes can be any variety of potato such as Idahos, either red or white.

It is important, however, for reasons which will be hereinafter explained, that the potato be the whole potato as opposed to a peeled potato.

The whole potatoes are subdivided to provide potato pieces. Subdivision can be accomplished by communition, shredding, slicing or cutting, or any other suitable means of subdivision. The whole potato pieces have their normal potato moisture content which typically ranges from about 80% to about 85% moisture and very commonly around 82%. Where the potatoes are subdivided by slicing into chunks, it is preferred that such chunks have a maximum thickest portion within the range of from about ⅜ inch to about ¼ inch and most preferably about 3/16ths inch. It is also worthy of note that the potatoes are not prior to such subdivision dehydrated in any manner, the potatoes thereby retaining all of their original moisture content, and their vitamins being retained at or near the skin surface of the potatoes. Keeping the skins on the potatoe pieces has been found valuable in that the skins do provide some protein fortification and in addition, provide a barrier against subsequent losses of protein and vitamin values during the hereinafter explained processing steps.

After the whole raw potatoes have been subdivided in the manner hereinbefore described, an edible protein fortifying additive is added to the raw whole potato pieces on a weight basis level of from about 10% to about 40% by weight of said raw whole potato pieces. The preferred level of addition is from about 15% to about 30% by weight of said whole potato pieces.

If desired, cooked potatoes may also be employed in the process as opposed to beginning with raw potatoes.

If desired, prior to the addition of the edible protein containing additive, the details of which are described hereinafter, an additional blanching step may be performed. In this blanching step the whole raw potato pieces are water blanched at a temperature of from about 140° F. to about 200° F. for from about 15 seconds to about 2 minutes and most preferably from about 160° F. to about 180° F. for from 30 seconds to 45 seconds.

The blanching step is not critical and may be omitted if desired; however, it is desirable to employ it where a fully cooked crisp product is desired.

An additional step, which follows blanching and which like the blanching is non-critical, may also be employed. This additional step is a pre-drying step and is preferably employed whenever the blanching step is employed. As can be appreciated increased water uptake occurs during blanching increasing the potato water content beyond its natural moisture content of for example 82%. Thus, it is desirable where blanching has occurred to practice a pre-drying step which dries the blanched potato pieces to a moisture content within the range of from 60% to 75% by weight, nearer the natural moisture content of potatoes. Such predrying may be at 300°–450° F. for 3 to 20 minutes.

As heretofore explained, the potato pieces are next added to a protein containing additive, the amount of protein containing additive being from about 10% by weight to about 40% by weight of the potato pieces, and preferably from about 15% to about 30% by weight of the potato pieces. It has been found important to not exceed in excess of 40% by weight of the potato pieces in that if this level is exceeded, the potato flavor is dominated by the additive flavors, and the product does not appear to be a snack food tasting like item to consumers. Levels of at least 10% are required in order to provide any significant protein fortification. Levels within the preferred range of 15% to 30% are desirable in that within such range ease of subsequent processing has been found most desirable.

Suitable edible protein additives include textured vegetable proteins, such as soy protein or the like, meat pieces, other vegetable proteins, dried fruit particles, milk solids and so forth.

If one desires a product dominated by the cooked potato flavor, it has been found that the preferred edible protein additive is a textured vegetable protein bland in taste. In this regard, no criticality exists with regard to the source of edible protein.

The usual source of such proteins is vegetable protein; however, animal protein may also be employed in the form of either cooked or raw meat chunks. Examples of suitable vegetable protein sources are soybeans, safflower seed, corn, peanuts, wheat, peas, sunflower seed, cottonseed, coconut, rapeseed, sesame seed, leaf proteins, single cell proteins such as yeast, and the like. Generally, if the protein source is a vegetable protein, the protein prior to use is placed in a relatively pure form. Thus, for example, if the protein source is soybeans, the soybeans may be dehulled and solvent extracted, preferably with hexane, to remove the oil therefrom. The resulting oil-free soybean meal is then suspended in water, and alkali is added to dissolve the protein and leave behind undissolved carbohydrates. Thereafter the protein is precipitated from the alkaline solution by the addition of an acidic substance. Precipitated protein is then washed and dried to prepare a substantially pure protein isolate. Similar methods can be utilized with regard to other cereal sources of protein.

If desired, animal protein sources can be used. These include animal proteins such as those derived from milk, poultry, meat, and/or fish. A typical example of a suitable animal protein is egg albumin.

It is important to note that the protein portion can be either a heat-coagulable or any other edible protein.

After the protein additive is added to the whole potato pieces at the levels specified herein, the two are intimately admixed in a manner to provide a substantially homogeneous mixture. At this point it should be noted that the water base provided for the entire mixture is the water provided from the initial raw potato pieces. This water is itself vitamin fortified in that it contains some of the substantial vitamin values of the potato, thereby increasing the entire nutrient content of the prepared food.

No criticality exists in regard to the type of mixing device utilized, providing that the mixer does in fact provide substantially homogeneous mixing. For example, the mixer may be a planetary paddle mixer, a sigma mixer, a ribbon blender, a twin paddle mixer, a Hobart mixer, and others such as Omnimixers.

There is no criticality with regard to the time of mixing or the RPMs, the test merely being sufficient mixing to provide a substantially homogeneous mixture. A homogeneous mixture will have a dough like consistency and appearance and generally where the protein additive is a textured vegetable protein and raw whole potatoes are used, such suitable mixing can be accomplished with five to ten minutes of mixing time.

After preparation of a substantially homogeneous mixture in which the raw potato pieces, including the potato skins and the edible protein fortifying additive, such as textured vegetable protein, or meat pieces, are intimately admixed to provide a substantially homogeneous mixture, the mixture is ready for partially cooking, puffing and/or baking to provide the protein fortified snack food. The process may also be employed to make pasta products such as Japanese noodles and soybean curd soup.

In accordance with the process of this invention, the admixed, substantially homogeneous mixture previously described herein is fed into an extruder wherein it is subjected to high temperature pressure for a short period of time, with the resulting protein fortified snack food item in finished form being dispensed from the extruder barrel.

Extruders per se are of course well known and a detailed description need not be given herein. However, in most cooker extruders, the product which is fed into the cooker extruder through a hopper is subjected to heat and pressure as it passes through the extruder barrel. As the extrudate enters the atmosphere, it expands to form a cooked product, with the moisture substantially driven off, and the product having a puffed like appearance, such as most snack food products. The exact shape of the product depends upon the die at the end of the extruder barrel and can be regulated by known conventional means.

While extruders such as a Brabender cooker-extruder can be employed for this invention, it has been found preferable to utilize food extrusion machinery manufactured by Wenger Manufacturing Company of Sabatha, Kans. Suitable extruder processing for this invention can be accomplished on the Wenger Snack Food Extruder described in Bulletin No. 28-877, the Wenger X-25S High Capacity Snack Food Production System described in Bulletin No. 28-977, and the Wenger X-25CF Extrusion Cooker described in Bulletin No. 28-73-76 as well as the F20 Extruder Cooker. The Bulletins and literature specifically mentioned herein are incorporated herein by reference.

In typical operations with such Wenger short time high temperature extrusion cookers, temperatures of from 100° to 400° F. are employed, and pressures of from 50 psi to 1000 psi. Preferably the temperature is within the range of from 200 to 300, and the pressure is from 200 to 500.

It should be mentioned that the pressures and temperatures given herein are for substantially complete cooking of the fortified snack food product.

If the product which is not completely cooked is desired, the temperature can be reduced by reducing the water temperature jacket around the extruder barrel and the resulting product will appear as an extruded substantially homogeneous dough like material if desired. Such dough like materials can be packaged in sealable water tight packages and squeezed to provide food. Typical packages which may be employed for such uses are the retortable pouch made by American Can Company and sold under the trademark Ready Serve Pack.

Also, if desired, prior to the extrusion process minor amounts of flavoring, such as meat flavorings, fruit flavorings, safe but effective food colorings, and safe but effective preservatives such as BHA and BHT can also be added. The amounts are not critical and suitable small but effective amounts may be employed as ingredient minors.

EXAMPLE

In one typical example of the process of this invention whole unpeeled raw potatoes having a moisture content of 82% were blanched in boiling water. Slices of the potato were cut at a thickness of from 3/16ths to ¼ inch and were submerged in water for 15 seconds at 140° F. to complete the blanching. The blanched potatoes were then predried in a predrying oven at 400° F. for 15 minutes to reduce the moisture content to 74%. These whole potatoes were then fed into a Wenger F20 extruder maintained at a temperature of 55° F. and a pressure of <100. Prior to placing the blanched potatoes into the extruder, a protein fortifying additive of textured vegetable protein at a level of 30% was added, and the mixture was intimately homogeneously mixed at 80 RPM in a mixer blender. The product as it exited from the extruder die was somewhat sticky and was cut by hand with a knife into cylinders of ½ inch diameter. The cylindrical chunks were then deep fat fried in a stabilized hydrogenated vegetable oil at 325° F. for three minutes. The products were protein fortified the protein fortifying additive having been admixed with the raw potatoes at a level of 30%. The product appearance was similar to that of "Tater Tots" presently sold on the marketplace.

Substantially similar results were obtained when extruder temperatures and pressures were elevated to 55° F.+100 psi and the protein fortifying textured vegetable protein of this example was substituted with actual meat pieces, fruit pieces or the like.

In addition, the product of this invention which was deep fat fried, if desired, can be placed in a retortable pouch and used as a squeeze food item.

It can therefore be seen that the invention accomplishes at least all of its stated objects.

What is claimed is:

1. A process of preparing a whole potato based complete meal snack item, comprising, subdividing unpeeled, raw, whole potatoes to provide pieces, blancing said subdivided unpeeled, raw, whole potatoes at a temperature of from about 140° F. to about 200° F. for from 15 seconds to about 2 minutes; and thereafter, predrying said blanched potatoes to a moisture content of from 60% to about 75% by weight; and thereafter adding on a weight basis of from 15% to 40% by weight of said potato pieces of an edible protein containing additive, intimately admixing said protein additive and said unpeeled whole potato pieces to provide a substantially homogeneous mixture, extruder cooking at elevated temperature and pressure said homogeneous mixture to provide a cooked, protein fortified snack food extrudate with predominant potato flavor.

2. The process of claim 1 wherein said whole potatoes are subdivided to chunks having a thickest portion within the range of from about ⅛ inch to about ¼ inch.

3. The process of claim 2 wherein said subdivision is accomplished by shredding said whole potatoes.

4. The process of claim 1 wherein said protein additives are selected from the group consisting of textured vegetable protein, meat and meat byproducts, dried fruit bits, and milk protein.

5. The process of claim 1 wherein small but effective amounts of flavoring, preservatives and colorings are added prior to said extruder cooking and treating.

6. The process of claim 1 wherein said elevated temperature and pressure is within the range of from 100° F. to 400° F. at a pressure of from 50 p.s.i. to 1000 p.s.i.

7. The process of claim 1 wherein said temperatures from 200° F. to 300° F. and said pressure from 200 p.s.i. to 500 p.s.i.

* * * * *